United States Patent [19]
Parris et al.

[11] Patent Number: 6,011,075
[45] Date of Patent: Jan. 4, 2000

[54] ENHANCING GEL STRENGTH

[75] Inventors: Michael D. Parris, Richmond; Richard D. Hutchins, Sugar Land, both of Tex.

[73] Assignee: Schlumberger Technology Corporation, Sugar Land, Tex.

[21] Appl. No.: 09/017,436

[22] Filed: Feb. 2, 1998

[51] Int. Cl.[7] ............................... E21B 33/13; C08J 9/28
[52] U.S. Cl. ........................ 521/64; 166/292; 166/293; 166/295; 521/62; 521/63; 521/149
[58] Field of Search ............................. 521/63, 64, 62, 521/149; 166/292, 293, 295

[56] References Cited

U.S. PATENT DOCUMENTS

| | | |
|---|---|---|
| 3,202,214 | 8/1965 | McLaughlin et al. . |
| 3,720,534 | 3/1973 | Macaulay et al. ..................... 521/63 |
| 3,965,986 | 6/1976 | Christopher . |
| 4,015,995 | 4/1977 | Hess . |
| 4,683,949 | 8/1987 | Sydansk et al. . |
| 4,732,213 | 3/1988 | Bennett et al. . |
| 4,901,797 | 2/1990 | Summers et al. . |
| 5,246,073 | 9/1993 | Sandiford et al. . |
| 5,697,440 | 12/1997 | Weaver et al. . |

OTHER PUBLICATIONS

Borling et al, "Pushing Out the Oil with Conformance Control", Oilfield Review (Apr. 1994) pp. 44–58.

SPE 18505 "Oilfield Applications of Colloidal Silica Gel", Jurinak, et al, Nov. 1991.

Cameron, et al, "Fracturing–Fluid Flow Behavior". Chapter 9, pp. 194, 196–197. Gidley, et al, *Recent Advances in Hydraulic Fracturing*. Society of Petroleum Engineers, 1989.

Allied Colloids, Inc. Product Bulletin for ALCOFLOOD 254S, (Apr. 1990).

Ferry, John D., "Gels Cross–linked in Solution". Chapter 17, Section E, p. 529. In *Viscoelastic Properties of Polymers*. John Wiley & Sons, Inc., (1980) p. 529.

*Primary Examiner*—Morton Foelak
*Attorney, Agent, or Firm*—Douglas Y'Barbo

[57] ABSTRACT

A composition adapted to form a strengthened gel for treating subterranean formations is described, the composition comprising an aqueous liquid containing an effective amount of a water soluble crosslinkable polymeric gel forming material and a crosslinking agent in an amount sufficient to crosslink said material, and a gel strengthening amount of an inert colloidal particulate material. A method for forming a strengthened gel in at least a portion of a subterranean formation is also disclosed, the method comprising injecting into at least a portion of a formation an aqueous liquid gel forming composition of the type described, and allowing the aqueous liquid composition to form a strengthened gel.

44 Claims, 2 Drawing Sheets

ENHANCING GEL STRENGTH

FIELD OF THE INVENTION

The invention relates to compositions for forming strengthened gel compositions, and to the preparation and utilization of strengthened gels in subterranean formations. The invention is particularly useful in the selective plugging of permeable zones in subterranean formations and the plugging of subterranean fractures and leaks.

BACKGROUND OF THE INVENTION

The production of hydrocarbon fluid from a subterranean formation frequently involves the use of one or more displacing fluids, such as water, brine, steam, polymer solution, carbon dioxide, or miscible hydrocarbons, for driving the hydrocarbon fluid in the formation to a location, such as a well, where the fluid can be recovered. Unfortunately, hydrocarbon fluid bearing subterranean formations or strata are usually structurally heterogeneous, often containing zones of varying permeability and/or fractures. As is well recognized by those skilled in the art, channeling of the displacing or sweep fluid through the zones of greater permeability or fractures can occur to such an extent that the benefit of the displacing or sweep fluid is minimized or substantially reduced. Again, not infrequently, inefficient channeling of a displacing fluid may occur because of a misplaced casing perforation or a casing leak. Finally, cement used to bond casing to formation rock may develop flow channels, such channels permitting fluids to flow between zones which are intended to be isolated.

Prior to the invention, a variety of techniques have been developed for dealing with these problems, one widely adopted solution involving the formation of plugging gel in the channels to prevent undesired flow. In particular, by careful injection of a pre-gel solution and proper setting of a stable gel therefrom in the relevant location, the selected location may be permanently plugged and channeling eliminated. However, in some instances, a plugging gel is required that has a relatively higher gel strength, e.g., a gel strength nearer to that of rubber. For example, high permeability matrix sites or fractures near the wellbore, sites near casing leaks, or channels in wellbore casing cement are locations which may require that the strength of the plugging gel be substantially greater. Accordingly, a plugging gel which possesses increased gel strength might have significant economic and technical advantage in these wellbore applications. The invention addresses the production and utilization of such a gel.

SUMMARY OF THE INVENTION

Accordingly, in one embodiment, the invention relates to a novel composition or fluid comprising an aqueous liquid adapted to form a strengthened gel, the aqueous liquid including or comprising an effective amount of solid ingredient(s) providing, as determined by appropriate testing, increased gel strength upon formation of a gel. More particularly, as formulated in this embodiment, the compositions or fluids of the invention comprise an aqueous liquid, such as water, an effective amount of a water soluble crosslinkable polymeric gel forming material, and a crosslinking agent; and an effective or gel strengthening amount of an inert colloidal particulate material. In a further embodiment, the invention relates to a composition or fluid comprising an aqueous liquid adapted to form a strengthened gel, the composition being formed by blending, in any order, an aqueous liquid, such as water, an effective amount of a water soluble crosslinkable polymeric gel forming material, and a crosslinking agent; and an effective or gel strengthening amount of an inert colloidal particulate material. In both instances, the crosslinkable polymeric gel forming composition is preferably selected from water soluble crosslinkable polymers and polymerizable monomers capable of forming a water soluble crosslinkable polymer, and mixtures thereof. As used herein, the term "colloidal" is understood to refer not only to the size of the particles but to the capability of the particulate material in forming at least substantially stable dispersions in an aqueous liquid, while the term "inert" indicates that the particulate material retains its identity to at least a substantial extent in the aqueous liquid. In a further aspect of the invention, the aforementioned compositions of the invention may be foamed.

In yet another embodiment, the invention relates to a method for forming a strengthened gel in at least a portion of a subterranean formation comprising, injecting into at least a portion of a subterranean formation an aqueous liquid adapted to form a gel, the aqueous liquid comprising an effective amount of a water soluble polymeric gel forming material, and a crosslinking agent, as described, the aqueous liquid further comprising an inert colloidal particulate material in a gel strengthening amount, and allowing the aqueous liquid to form a strengthened gel in at least a portion of the formation. The aqueous liquid may be formed by blending the components, as described previously. As utilized hereinafter, the term "average greatest particle dimension" simply refers to the longest linear or diametric dimension of the particles, as a rational description, since the particles may have a variety of shapes ranging from simple round (spherical) or oval to more complex irregular, or even cylindrical or rod-like shapes. In yet a further aspect of the invention, the composition may be formed in situ in the subterranean formation, or on the fly. The strengthened gel formed in the subterranean formation may be used to plug a permeable zone, plug leaks, or stop channeling between zones, etc. Other aspects and embodiments of the invention will become apparent to those skilled in the art upon reading the further disclosure hereinafter.

DETAILED DESCRIPTION OF THE INVENTION

Figure 1:
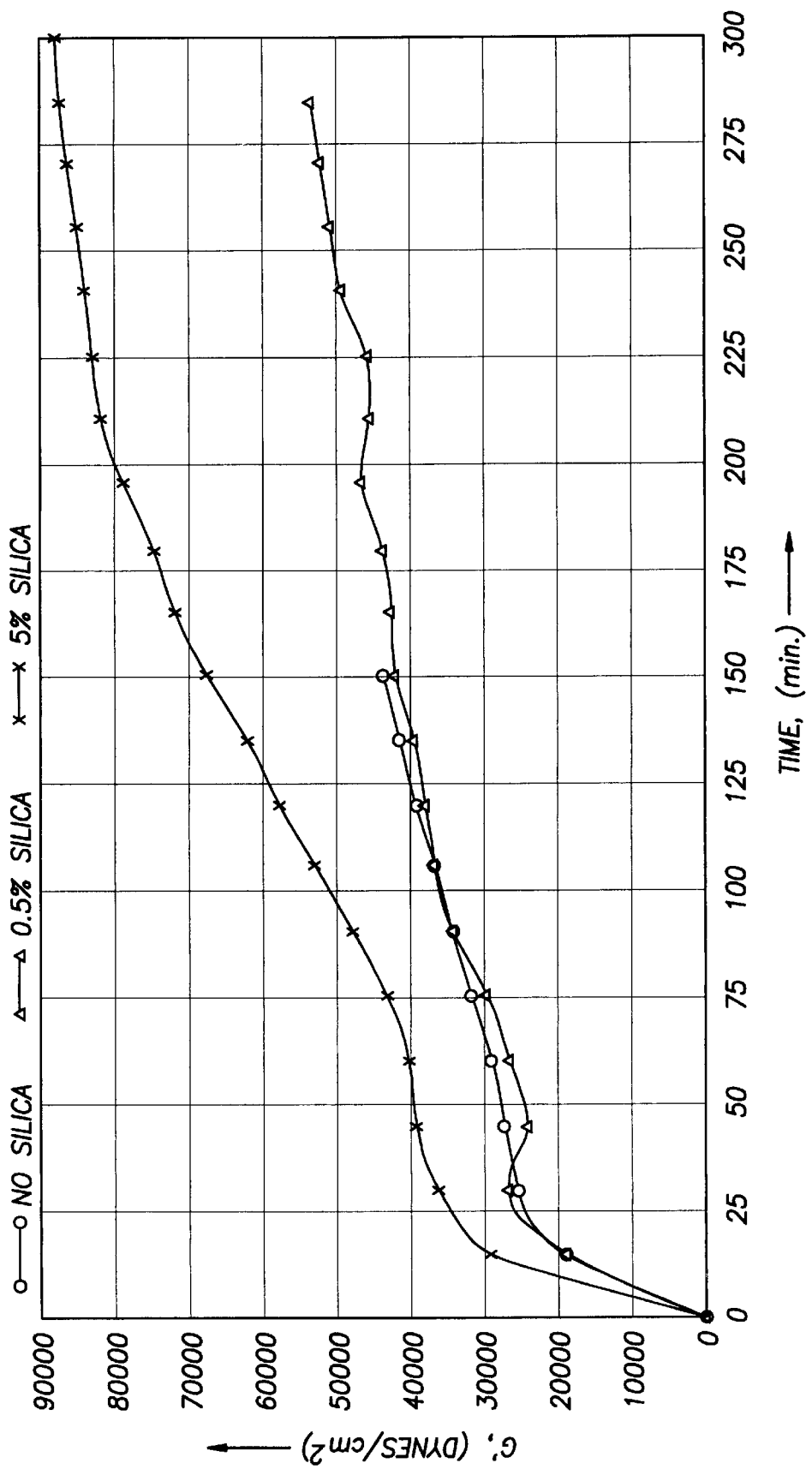
FIG. 1 illustrates graphically the improvement in gel strength of chromium acetate crosslinked polymer gel obtained by practice of the invention.

The invention proceeds from the discovery that particles or particulates, capable of forming colloidal suspensions, when employed in specified concentrations with respect to the aqueous liquid or suspending fluid and a crosslinkable polymeric gel forming material, produce a strengthened gel, as determined by laboratory testing at common wellbore conditions, with such gelling materials. More particularly, it has been discovered that particulates, when supplied to or mixed in a size range, i.e., colloidal in size, and in specified ratios in an aqueous suspending fluid containing a water soluble crosslinkable polymeric gel forming material, such as a crosslinkable polymer or monomer or monomers which produce such polymer, yield, in such tests, and under appropriate conditions, a gel having unexpectedly higher gel strength than gels similarly produced without the colloidal particles.

Because the particulates employed are colloidal in size, they can remain suspended in the wellbore liquid during pre-gel and gelling stages, and can penetrate the strata. In general, the particles will have their greatest dimension (average) of from about 6 nm (nanometers) to about 100 nm, preferably 8 nm to about 40 nm, this dimension, in the case of spherical particles, being the diameter, and in the case of other particles, such as rods or irregular shape, simply being the longest dimension. The colloidal particles are supplied in a gel strengthening amount, i.e., an amount that will produce an increase in the gel strength of the gel in which it is incorporated. As will be understood by those skilled in the art, this amount will vary with the gel forming substance, the crosslinking agent, and the colloidal particles employed. For example, in the case of "organic" crosslinking agents, described hereinafter, the colloidal particles may preferably be supplied in the aqueous liquid in an amount of from about 0.1 percent to about 20 percent, more preferably from about 0.2 percent to about 10 percent, and most preferably from about 0.3 percent to about 5 percent, all percentages expressed by weight, based on the total weight of all ingredients present in the gel-forming composition. On the other hand, for other crosslinking agents, e.g., at least one "inorganic" crosslinking agent, as also described further hereinafter, a somewhat higher threshold quantity of colloidal particles may be required, e.g., greater than 0.5 percent by weight, the upper limits of quantities which may be supplied being similar. In any event, a "gel strengthening amount" may be determined in each case by routine testing, such as, for example, by the tests described hereinafter.

A wide variety of particulate materials may be employed in the invention, and the term "particulate material" is to be understood as inclusive of mixtures of such materials. It has further been discovered that the nature of the particulates, in general, is not a key variable, provided that the particulates are inert, as described, and dispersion forming. These requirements do not preclude, however, some possible bonding of the colloidal particulates with the gel forming polymer(s) and/or crosslinking agent(s). Silica compositions, such as amorphous silicon dioxide ($SiO_2$) and various silicates; clays; minerals, such as $CaCO_3$; polymeric materials, such as latex polymers; finely divided metals, and mixtures thereof, within the constraints or requirements mentioned, may be employed. Silica compositions, including mixtures thereof, such as those utilized for forming silicate gels, are preferred. Particularly preferred are colloidal silica compositions (and mixtures thereof) supplied by the DuPont Corporation under the trade name of Ludox®, such as Ludox®SM, Ludox®HS, Ludox®TM, and Ludox®AM, the surface of the last-mentioned silica composition being modified with aluminate ions.

Any suitable water soluble crosslinkable polymeric gel forming material used by those skilled in the art to treat subterranean formations and form stable or stabilized gels therein may be employed in the invention. Included in the phrase "water soluble", for simplicity hereinafter, are those suitable polymeric materials which are dispersible or suspendable in water or aqueous liquid. As further indicated, suitable materials include crosslinkable polymers or monomers for forming such polymers under the conditions extant. Such crosslinkable polymeric and polymer forming materials are well known, and the crosslinked polymer or polymers which produce the stable or stabilized gel are preferably formed by reacting or contacting appropriate proportions of the crosslinkable polymer with a crosslinking agent or agents. Similarly, procedures for preparing gelable compositions or fluids and conditions under which such compositions form stable gels in subterranean formations are well known to those skilled in the art. In the context of the invention, the gels contemplated are "stable" or "stabilized", i.e., having permanent or substantial lifetime under the subterranean conditions, as distinguished from relatively transient compositions such as may be utilized, for example, in fracturing operations. U.S. Pat. No. 4,683,949 (Sydansk and Argabright) and U.S. Pat. No. 5,246,073 (Sandiford, Dovan and Hutchins), incorporated herein by reference, describe procedures for gel preparation, including particular components and stabilizing additives, the latter mentioned patent containing an extensive listing of patents purportedly exemplifying crosslinked polymer forming agents and indicating the well-developed state of this art. As indicated, gel-forming compositions according to the invention may be formed by mixing, in water, the water soluble crosslinkable polymer and the crosslinking agent.

In forming the gel, the crosslinkable polymer(s) and crosslinking agent concentrations are normally selected to assure (a) gel stability at reservoir (i.e., subterranean) conditions and (b) suitable time allotment for injection of the composition prior to the beginning of gelation. The polymer (or monomers used to form the polymer) and the crosslinking agent are generally supplied in amounts effective to achieve these objectives. By "effective" or "sufficient" amounts of the polymeric material or polymers (or monomers) and crosslinking agents is meant amounts sufficient to provide crosslinked polymers and form the desired stable gel under the conditions extant. In general, a water soluble crosslinkable polymer concentration in the aqueous liquid of from about 0.05 to about 40 percent, preferably from about 0.1 percent to about 10 percent, and, most preferably, from about 0.2 percent to about 7 percent, will be employed (or sufficient monomer(s) to form these amounts of polymer). Unless otherwise indicated or clearly inconsistent with the intended meaning of the accompanying text, all percentages expressed herein are by weight, based on the total weight of all ingredients present in the relevant composition. Typically, the crosslinking agent is employed in the aqueous liquid in a concentration of from about 0.001 percent to about 2 percent, preferably about from about 0.005 percent to about 1.5 percent, and, most preferably, from about 0.01 percent to about 1.0 percent.

However, as indicated previously, as formulated at the surface, the fluids of the invention need not contain both the crosslinkable polymer and the crosslinking agent. The crosslinkable polymer or the crosslinking agent may be omitted from the fluid sent downhole, the omitted material being introduced into the subterranean formation as a separate slug, either before, after, or simultaneously with the introduction of the fluid (on the fly). In such cases, concentrations of the slugs will be adjusted to insure the required ratios of the components for proper gel formation at the desired location. Preferably, the composition comprises both (a) the crosslinking agent and (b) either (i) the crosslinkable polymer or (ii) the polymerizable monomers capable of forming a crosslinkable polymer. In treating a subterranean fracture, the formulations may be allowed to begin gelation before entering the formation.

As noted, the crosslinkable polymeric gel forming material is water soluble, and the phrase "polymeric gel forming material" is to be understood as encompassing mixtures of such compositions. Materials which may be used include water soluble crosslinkable polymers, copolymers, and terpolymers, such as polyvinyl polymers, polyacrylamides, cellulose ethers, polysaccharides, lignosulfonates, ammonium salts thereof, alkali metal salts thereof, alkaline earth salts of lignosulfonates, and mixtures thereof. Specific polymers include acrylamide copolymers and terpolymers, acrylic acid-methacrylamide copolymers, polyacrylamides, partially hydrolyzed polyacrylamides, partially hydrolyzed polymethacrylamides, polyvinyl alcohol, polyvinyl acetate, polyalkyleneoxides, carboxycelluloses, carboxyalkylhydroxyethyl celluloses, hydroxyethylcellulose, galactomannans (e.g., guar gum), substituted galactomannans (e.g. hydroxypropyl guar), heteropolysaccharides obtained by the fermentation of starch-derived sugar (e.g., xanthan gum), ammonium and alkali metal salts thereof, and mixtures thereof. Preferred water soluble crosslinkable polymers include guar, hydroxypropyl guar, partially hydrolyzed polyacrylamides, xanthan gum, polyvinyl alcohol, copolymers and terpolymers containing acrylic acid, acrylamide, N-vinylpyrrolidone, or sodium-2-acrylamido-2-methylpropane sulfonate, ammonium and alkali metal salts thereof, and mixtures thereof.

Similarly, the crosslinking agent(s) may be selected from those organic and inorganic compounds well known to those skilled in the art useful for such purpose, and the phrase "crosslinking agent", as used herein, includes mixtures of such compounds. Exemplary organic crosslinking agents include, but are not limited to, aldehydes, dialdehydes, phenols, substituted phenols, ethers, and mixtures thereof. Phenol, resorcinol, catechol, phloroglucinol, gallic acid, pyrogallol, 4,4'-diphenol, 1,3-dihydroxynaphthalene, 1,4-benzoquinone, hydroquinone, quin-hydrone, tannin, phenyl acetate, phenyl benzoate, 1-naphthyl acetate, 2-naphthyl acetate, phenyl chloracetate, hydroxy-phenylalkanols, formaldehyde, paraformaldehyde, acetal-dehyde, propionaldehyde, butyraldehyde, isobutyraldehyde, valeraldehyde, heptaldehyde, decanal, glyoxal, glutaraldehyde, terephthaldehyde, hexamethylenetetramine, trioxane, tetraoxane, polyoxymethylene, and divinylether may be used. Typical inorganic crosslinking agents are polyvalent metals, chelated polyvalent metals, and compounds capable of yielding polyvalent metals, including organometallic compounds as well as borates and boron complexes, and mixtures thereof. Preferred inorganic crosslinking agents include chromium salts, complexes, or chelates, such as chromium nitrate, chromium citrate, chromium acetate, chromium propionate, chromium malonate, chromium lactate, etc.; aluminum salts, such as aluminum citrate, aluminates, and aluminum complexes and chelates; titanium salts, complexes, and chelates; zirconium salts, complexes or chelates, such as zirconium lactate; and boron containing compounds such as boric acid, borates, and boron complexes.

As mentioned, the pre-gel fluid formed in the invention may be foamed, normally by use of a suitable foaming gas, such as nitrogen, natural gas, carbon dioxide, air, helium, immiscible hydrocarbon gas(es), and mixtures thereof, in an amount sufficient to foam the fluid. Foaming procedures are well known, and per se form no part of the invention. In such instances, the fluids of the invention will preferably include an effective or sufficient quantity of a surfactant or surfactants. Preferred surfactants are water-soluble or dispersible and have sufficient foaming ability to enable the composition, when traversed or agitated by the non-reactive gas, to foam. The surfactant(s) may be ionic or nonionic, and the selection of a suitable surface active agent or agents is within the ability of those skilled in the art. Preferred surfactants are those which, when incorporated into water in a concentration of about 5 weight percent or less (based on the total weight of water and surfactant), meet the test described in the aforementioned U.S. Pat. No. 5,246,073.

The following experiments were conducted.

I

In the first set of experiments, samples of a seven percent water soluble crosslinked polymer stock solution (in synthetic sea water) were diluted to five percent by adding synthetic sea water and the appropriate ingredients with stirring to make up a 100 ml samples. The polymer was Alcoflood 254S (Allied Colloids), a partially hydrolyzed (3%–5%) polyacrylamide, molecular weight approximately 500,000, and crosslinked with 6250 ppm by weight of chromium (III) acetate (50% active, by McGean-Rhoco). Three samples were prepared: 1) a control (no colloidal particles); 2) a sample containing 0.5% silica; and 3) a sample containing 5% silica, each concentration being the solids weight percent with respect to the total sample. The silica was a nominal 20 nanometer colloidal silica (Ludox®TM) supplied by the manufacturer as a fluid. Rheological evaluation of the formulations was performed utilizing a Rheometrics Pressure Rheometer using a Couette measurement geometry wherein the cup diameter is 36 mm, the bob height is 40 mm, and the bob outer diameter is 31 mm. The rheometer oil bath was pre-heated to test temperature, and a baseline (first point) was run at ambient temperature. The bath was then raised around the sample cup containing the sample. The storage moduli G', measured in dynes/cm$^2$, generated at fixed time intervals of typically 20 to 60 minutes, were measured at 2 radians/second strain rate and 10% strain. Results of the experiments are shown plotted in FIG. 1.

As will be evident to those skilled in the art, the graph of FIG. 1 illustrates significant gel strength improvement over time.

II

Figure 2:
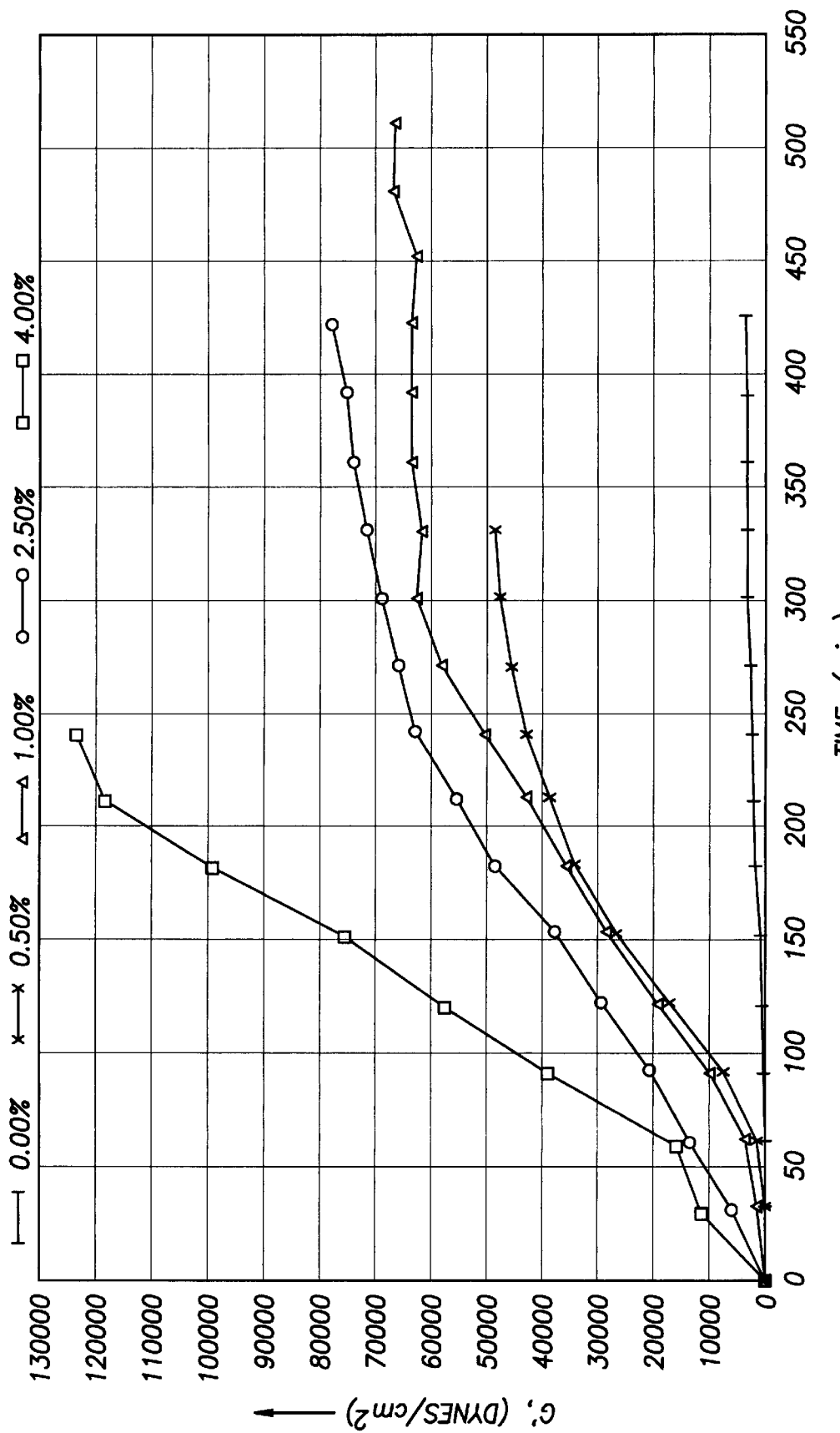
FIG. 2 illustrates graphically the improvement in strength of a gel crosslinked with hexamethylenetetramine and phenyl acetate obtained by practice of the invention.

The procedure described for the first set of experiments was repeated except that the crosslinking agent was a mixture of hexamethylenetetramine (Borden) and phenyl acetate (Aldrich) and used 3000 ppm each by weight, and samples having concentrations of 0%, 0.5%, 1.0%, 2.5%, and 4.0% colloidal silica were tested. As demonstrated in FIG. 2, excellent improvement in gel strength is apparent. Unexpectedly, the gels prepared with the organic crosslinkers show increases in gel strength relative to those formulated with chromium crosslinker.

III

Capillary extrusion tests were conducted utilizing 30 cm by 0.508 mm ID capillaries. In these tests, each sample of pre-gel solution was injected into a capillary with a syringe, the ends of each capillary were capped, and the capillaries were placed in an oven at a temperature and for a time sufficient to crosslink the polymer. The capillaries were then removed from the oven and connected to the discharge of a computer controlled chromatography preparation pump. A 2% KCl brine was then injected into each capillary to increase the pressure at a rate of 25 psi/minute until the gel failed to hold the pressure. The results of the tests are shown in the following table. Clearly, the addition of the colloidal particulates significantly increases the pressure required to extrude the gel in the capillary.

TABLE

| Test No. | Polymer Conc. (%) | Crosslinker | Silica Conc. (%) | Failure Pressure |
|---|---|---|---|---|
| 1 | 5 | Cr(Ac)₃* | 0 | 4127 psi |
| 2 | 5 | Cr(Ac)₃ | 2.0 | >10000 psi |
| 3 | 5 | Cr(Ac)₃ | 0 | 6158 psi |
| 4 | 5 | Cr(Ac)₃ | 2.0 | 9000 psi |
| 5 | 5 | HMTA/PA** | 0 | 1952 psi |
| 6 | 5 | HMTA/PA | 2.0 | 5107 psi |
| 7 | 5 | HHTA/PA | 0 | 3600 psi |
| 8 | 5 | HMTA/PA | 2.0 | 4645 psi |

*6250 ppm chromium (III) acetate
**hexamethylenetetramine/phenyl acetate, 3000 ppm each of hexamethylene-tetramine and phenyl acetate

What is claimed is:

1. A composition comprising an aqueous liquid adapted to form a strengthened stable plugging gel in a subterranean formation, said aqueous liquid comprising an effective amount of a water soluble crosslinkable polymeric stable gel forming material, and a crosslinking agent in an amount sufficient to crosslink said material; and a gel strengthening amount of an inert colloidal particulate material.

2. The composition of claim 1 in which the gel forming material is selected from water soluble crosslinkable polymers and polymerizable monomers capable of forming a water soluble crosslinkable polymer.

3. The composition of claim 1 in which the gel forming material is selected from acrylamide copolymers and terpolymers, acrylic acid-methacrylamide copolymers, polyacrylamides, partially hydrolyzed polyacrylamides, partially hydrolyzed polymethacrylamides, polyvinyl alcohol, polyvinyl acetate, polyalkyleneoxides, carboxycelluloses, carboxyalkylhydroxyethyl celluloses, hydroxyethylcellulose, galactomannans, substituted galactomannans, heteropolysaccharides obtained by the fermentation of starch-derived sugar, ammonium and alkali metal salts thereof, and mixtures thereof.

4. The composition of claim 1 in which the inert colloidal particulate material has an average greatest particle dimension of from about 6 nanometers to about 100 nanometers.

5. The composition of claim 1 in which the inert colloidal particulate material has an average greatest particle dimension of from about 8 nanometers to about 40 nanometers.

6. The composition of claim 1 in which the inert colloidal particulate material comprises a colloidal silica composition.

7. The composition of claim 1 in which the inert colloidal particulate material comprises a colloidal silica.

8. The composition of claim 4 further comprising a foaming gas and a surfactant or surfactants, in amounts sufficient to foam the composition.

9. A composition comprising an aqueous liquid adapted to form a strengthened stable plugging gel in a subterranean formation, said composition formed by blending, in any order, an aqueous liquid, an effective amount of a water soluble crosslinkable polymeric stable gel forming material, and a crosslinking agent in an amount sufficient to crosslink said material; and a gel strengthening amount of an inert colloidal particulate material.

10. The composition of claim 9 in which the gel forming material is selected from water soluble crosslinkable polymers and polymerizable monomers capable of forming a water soluble crosslinkable polymer.

11. The composition of claim 9 in which the gel forming material is selected from acrylamide copolymers and terpolymers, acrylic acid-methacrylamide copolymers, polyacrylamides, partially hydrolyzed polyacrylamides, partially hydrolyzed polymethacrylamides, polyvinyl alcohol, polyvinyl acetate, polyalkyleneoxides, carboxycelluloses, carboxyalkylhydroxyethyl celluloses, hydroxyethylcellulose, galactomannans, substituted galactomannans, heteropolysaccharides obtained by the fermentation of starch-derived sugar, ammonium and alkali metal salts thereof, and mixtures thereof.

12. The composition of claim 9 in which the inert colloidal particulate material has an average greatest particle dimension of from about 6 nanometers to about 100 nanometers.

13. The composition of claim 9 in which the inert colloidal particulate material has an average greatest particle dimension of from about 8 nanometers to about 40 nanometers.

14. The composition of claim 9 in which the inert colloidal particulate material comprises a colloidal silica composition, and mixtures thereof.

15. The composition of claim 9 in which the inert colloidal particulate material comprises colloidal silica, and mixtures thereof.

16. The composition of claim 9 further comprising a foaming gas and a surfactant or surfactants, in amounts sufficient to foam the composition.

17. A method for forming a strengthened stable gel in at least a portion of a subterranean formation comprising, injecting into at least a portion of a formation an aqueous liquid adapted to form a gel, said aqueous liquid comprising an effective amount of a water soluble crosslinkable polymeric gel forming material, and a crosslinking agent in an amount sufficient to crosslink said material; said aqueous liquid further comprising a gel strengthening amount of an inert colloidal particulate material, and allowing the aqueous liquid to form a strengthened gel in at least a portion of the formation.

18. The method of claim 17 in which the gel forming material is selected from water soluble crosslinkable polymers and polymerizable monomers capable of forming a water soluble crosslinkable polymer.

19. The method of claim 17 in which the gel forming material is selected from acrylamide copolymers and terpolymers, acrylic acid-methacrylamide copolymers, polyacrylamides, partially hydrolyzed polyacrylamides, partially hydrolyzed polymethacrylamides, polyvinyl alcohol, polyvinyl acetate, polyalkyleneoxides, carboxycelluloses, carboxyalkylhydroxyethyl celluloses, hydroxyethylcellulose, galactomannans, substituted galactomannans, heteropolysaccharides obtained by the fermentation of starch-derived sugar, ammonium and alkali metal salts thereof, and mixtures thereof.

20. The method of claim 17 in which the inert colloidal particulate material has an average greatest particle dimension of from about 6 nanometers to about 100 nanometers.

21. The method of claim 18 in which the inert colloidal particulate material has an average greatest particle dimension of from about 6 nanometers to about 100 nanometers.

22. The method of claim 17 in which a foaming gas and surfactant or surfactants, in amounts sufficient to foam the composition, are provided.

23. A method for forming a strengthened stable gel in at least a portion of a subterranean formation comprising, injecting into at least a portion of a formation an aqueous liquid gel forming composition, said composition formed by blending, in any order, an aqueous liquid, an effective amount of a water soluble crosslinkable polymeric stable gel forming material, and a crosslinking agent in an amount sufficient to crosslink said material; said aqueous liquid composition further comprising a gel strengthening amount of an inert colloidal particulate material, and allowing the aqueous liquid composition to form a strengthened gel in at least a portion of the formation.

24. The method of claim 23 in which the gel forming material is selected from water soluble crosslinkable polymers and polymerizable monomers capable of forming a water soluble crosslinkable polymer.

25. The method of claim 23 in which the gel forming material is selected from acrylamide copolymers and terpolymers, acrylic acid-methacrylamide copolymers, polyacrylamides, partially hydrolyzed polyacrylamides, partially hydrolyzed polymethacrylamides, polyvinyl alcohol, polyvinyl acetate, polyalkyleneoxides, carboxycelluloses, carboxyalkylhydroxyethyl celluloses, hydroxyethylcellulose, galactomannans, substituted galactomannans, heteropolysaccharides obtained by the fermentation of starch-derived sugar, ammonium and alkali metal salts thereof, and mixtures thereof.

26. The method of claim 23 in which the inert colloidal particulate material has an average greatest particle dimension of from about 6 nanometers to about 100 nanometers.

27. The method of claim 23 in which the inert colloidal particulate material has an average greatest particle dimension of from about 6 nanometers to about 100 nanometers.

28. The method of claim 23 in which a foaming gas and surfactant or surfactants, in amounts sufficient to foam the composition, are provided.

29. The composition of claim 3 in which the inert colloidal particulate material has an average greatest particle dimension of from about 8 nanometers to about 40 nanometers.

30. The composition of claim 29 in which the inert colloidal particulate material comprises a colloidal silica composition.

31. The composition of claim 9 which is blended on the fly.

32. The composition of claim 31 in which the inert colloidal particulate material has an average greatest particle dimension of from about 8 nanometers to about 40 nanometers.

33. The composition of claim 32 in which the inert colloidal particulate material comprises a colloidal silica composition.

34. The composition of claim 9 which begins gelation before entering the subterranean formation.

35. The composition of claim 34 in which the inert colloidal particulate material has an average greatest particle dimension of from about 8 nanometers to about 40 nanometers.

36. The composition of claim 35 in which the inert colloidal particulate material comprises a colloidal silica composition.

37. The method of claim 25 in which the inert colloidal particulate material has an average greatest particle dimension of from about 8 nanometers to about 40 nanometers.

38. The method of claim 37 in which the inert colloidal particulate material comprises a colloidal silica composition.

39. The method of claim 38 in which the gel forming composition is blended on the fly.

40. The method of claim 39 in which the crosslinking agent is introduced into the subterranean formation after the water soluble crosslinkable polymeric stable gel forming material is introduced.

41. The method of claim 40 in which the inert colloidal particulate material has an average greatest particle dimension of from about 8 nanometers to about 40 nanometers.

42. The method of claim 41 in which the inert colloidal particulate material comprises a colloidal silica composition.

43. The composition of claim 1 wherein the polymeric stable gel forming material comprises polymerizable monomers.

44. The composition of claim 23 wherein the polymeric stable gel forming material comprises polymerizable monomers.

* * * * *